United States Patent
Shea et al.

[11] Patent Number: 6,073,779
[45] Date of Patent: Jun. 13, 2000

[54] SLUDGE VACUUM SYSTEM

[76] Inventors: Edward M. Shea, 3388 E. Brockbank Dr., Holladay, Utah 84124; Kathleen R. Gammell, 637 E. Downing St., Midvale, Utah 84047

[21] Appl. No.: 09/256,371

[22] Filed: Feb. 24, 1999

[51] Int. Cl.⁷ .............................. B01D 21/20; B01D 21/24
[52] U.S. Cl. ........................... 210/527; 210/241; 210/525
[58] Field of Search ................................. 210/170, 241, 210/258, 523, 525, 527, 529, 530

[56] References Cited

U.S. PATENT DOCUMENTS

| | | | |
|---|---|---|---|
| 1,918,742 | 7/1933 | Elrod . | |
| 3,610,603 | 10/1971 | Schmitz | 210/527 |
| 4,005,019 | 1/1977 | Parlette | 210/525 |
| 4,193,877 | 3/1980 | Lillywhite | 210/525 |
| 4,401,576 | 8/1983 | Meurer | 210/525 |
| 4,477,939 | 10/1984 | White | 210/525 |
| 4,642,919 | 2/1987 | Werner | 37/58 |
| 4,876,010 | 10/1989 | Riddle | 210/525 |
| 4,957,622 | 9/1990 | Mims | 210/170 |
| 4,978,447 | 12/1990 | Hall | 210/241 |
| 4,992,000 | 2/1991 | Doleshal | 405/163 |
| 5,037,486 | 8/1991 | Sloan | 134/18 |
| 5,047,150 | 9/1991 | Mitchell | 210/525 |
| 5,078,869 | 1/1992 | DiGregorio | 210/527 |
| 5,078,873 | 1/1992 | Black | 210/264 |
| 5,219,470 | 6/1993 | Bradley | 210/525 |
| 5,286,384 | 2/1994 | Haag | 210/527 |
| 5,293,887 | 3/1994 | Thibodeaux | 134/24 |
| 5,545,324 | 8/1996 | Workman | 210/525 |

*Primary Examiner*—Thomas G. Wyse
*Attorney, Agent, or Firm*—Prince, Yeates & Geldzahler

[57] ABSTRACT

A sludge vacuum trolley (14) propels a sludge vacuum manifold (12) along the bottom of a settling basin or tank along a track (16) attached to the bottom of the settling basin. The sludge vacuum trolley (14) incorporates two drive wheels (26,27) that selectively engage the track to propel the sludge vacuum system therealong. The drive wheels (26, 27) are actuated by respective pneumatic rotary actuators (24, 25) whose rotary output shafts are connected to either air clutches or roller clutches, which in turn, drive the drive wheels. Air-actuated clamping cylinders (32, 33) selectively engage or disengage the drive wheels (26, 27) from the track so that the drive wheels will frictionally engage the track, and that rotation of the drive wheels by respective pneumatic rotary actuators will propel the sludge vacuum trolley along the track. Various embodiments of the sludge vacuum trolley utilize slightly different mechanical configurations and a variety of sequences of actuation of the respective pneumatic rotary actuators, air clutches, and clamping cylinders to propel the sludge vacuum trolley along the track in an incremental and step-wise progression.

39 Claims, 12 Drawing Sheets

SLUDGE VACUUM SYSTEM

BACKGROUND OF THE INVENTION

1. Field of the Invention

The present invention relates to an apparatus for removing sediment, sludge, liquid, etc. from the bottom of a settling basin or tank, and more particularly relates to a drive mechanism for propelling a sludge suction manifold along the bottom surface of the settling basin for withdrawing sediment and sludge from the basin, for instance, water from an oil/water settling basin, or generally any application wherein collected solids or liquid is to be withdrawn from the bottom of a settling basin or tank.

2. Description of the Prior Art

Clarifiers and settling basins for water- and other liquid-treatment plants are designed to collect sediment and sludge on the bottom thereof, thereby permitting the clarified effluent to be taken from the top of the basin and reused, recycled, or further treated. Sediment and sludge that separate from the liquid collect on the bottom of the settling basin, and periodically must be removed in order to prevent thick accumulations of sludge and sediment in the basin. Frequently, the sludge-containing liquid includes caustic or petroleum-based contaminants that would interfere with the efficient operation of submerged electric motors used either to pump sediment and sludge from the settling basin bottom, or to propel a sludge suction nozzle or manifold along the bottom of the settling basin. Therefore, currently used devices incorporate pneumatically actuated pumping and sludge suction manifold propelling mechanisms.

Various devices are in current use for removing such sludge and sediment. Typically, as shown in U.S. Pat. No. 4,401,576, a sludge collection or suction manifold is attached to a collection body that travels along a track fixed to the bottom of the settling basin. Propulsion systems for such sludge collection manifolds typically utilize a pair of clamps that alternately clamp onto the track along the bottom of the settling basin in a specified sequence such that (1) a leading clamp clamps onto the track, (2) a trailing clamp is shifted forward toward the leading clamp, (3) the trailing clamp clamps onto the track and the leading clamp is released from the track, (4) the trailing clamp shifts to the back of the propulsion mechanism, thereby propelling the propulsion mechanism forwardly, (5) the leading clamp clamps onto the track and the trailing clamp releases from the track, and (6) the sequence repeats itself so as to incrementally propel the propulsion mechanism and sludge collection manifold along the track. Similar systems, such as that shown in U.S. Pat. No. 5,078,873 also incorporate the clamp, slide, clamp, release, propel, clamp, release, slide sequence of incrementally moving the suction manifold (suction housing) along the bottom of the settling basin for removing the collected sludge and sediment therefrom.

Other sludge removal systems, as shown in U.S. Pat. No. 5,219,470, utilize a rotating suction housing in the bottom of a cylindrical basin that simply rotates about its center along the bottom of a circular basin for sediment and sludge removal.

Still other devices, as shown in U.S. Pat. Nos. 5,037,486 and 1,918,742, utilize externally-controlled and propelled mechanisms for moving the suction manifolds along the bottoms of the settling basins.

Problems with these currently used devices are that the externally- or remotely-controlled propulsion mechanisms for the sludge suction manifolds are much more complicated and have many more moving parts than the pneumatically actuated submerged propulsion systems. Therefore, these externally- or remotely-controlled propulsion mechanisms are much more prone to problems and failure. The pneumatically actuated propulsion systems that incrementally or step-wise pull the sludge suction housing along the bottom of the settling basin using the clamp, pull, unclamp, slide, etc. sequence must follow a straight track in the bottom of the settling basin, and therefore, are limited to only forward and reverse movement in a straight line.

In addition, because of the step-wise incremental movement of such systems, the "vacuuming" or "suction removal" of the sediment and sludge is not even or uniform, but rather is segmented. Specifically, as the clamps of the propulsion system are being shifted in order to clamp onto the track, the propulsion mechanism is actually stationary for a finite amount of time that the trailing clamp is being shifted to its forward position. In these series of stationary positions, the suction housing sucks more of the sediment and sludge from the settling basin bottom than it does when it is being propelled forward (i.e., when it is moving). This stop-start-stop-start movement of the propulsion system results in uneven sediment removal, and specifically results in rows of sludge and sediment being left on the bottom surface of the settling basin between the locations where the propulsion mechanism has stopped in order to shift the trailing clamp for the subsequent incremental "pull". If the sequence and speed of the propulsion system are slowed sufficiently to permit efficient and uniform removal of sediment and sludge from the settling basin bottom, the incremental times that the clamps are repositioning themselves for the subsequent "pull", the vacuum/suction mechanism withdraws a large amount of effluent unnecessarily from the settling basin, the sediment and sludge directly under the temporarily stationary suction housing having been already withdrawn from the basin bottom during the slow step-wise progression and stationary positioning of the suction housing during the slowed propulsion cycle.

OBJECTS OF THE INVENTION

It is therefore an objection of the present invention to provide a propulsion mechanism for sediment and sludge suction housings for settling basins that can easily and readily follow a curved track within a settling basin, in order that the sludge suction housing may be translated along more of the bottom surface of the settling basin.

It is a further object of the present invention to provide a propulsion mechanism for a sludge suction housing that can travel at essentially a uniform speed along the bottom of the settling basin, thereby providing for uniform suction along the settling basin bottom and eliminating the residual rows of unremoved sludge and sediment left behind as the conventional system shifts between its incremental step-wise movements along the track.

SUMMARY OF THE INVENTION

A sludge vacuum trolley (14) propels a sludge vacuum manifold (12) along the bottom of a settling basin or tank along a track (16) attached to the bottom of the settling basin. The sludge vacuum trolley (14) incorporates two drive wheels (26, 27) that selectively engage the track to propel the sludge vacuum system therealong. The drive wheels (26, 27) are actuated by respective pneumatic rotary actuators (24, 25) whose rotary output shafts are connected to either air clutches or roller clutches, which in turn, drive the drive wheels. Air-actuated clamping cylinders (32, 33)

selectively engage or disengage the drive wheels (26, 27) from the track so that the drive wheels will frictionally engage the track, and that rotation of the drive wheels by respective pneumatic rotary actuators will propel the sludge vacuum trolley along the track. Various embodiments of the sludge vacuum trolley utilize slightly different mechanical configurations and a variety of sequences of actuation of the respective pneumatic rotary actuators, air clutches, and clamping cylinders to propel the sludge vacuum trolley along the track in an incremental and step-wise progression.

DETAILED DESCRIPTION OF THE INVENTION

FIRST EMBODIMENT

Figure 1:
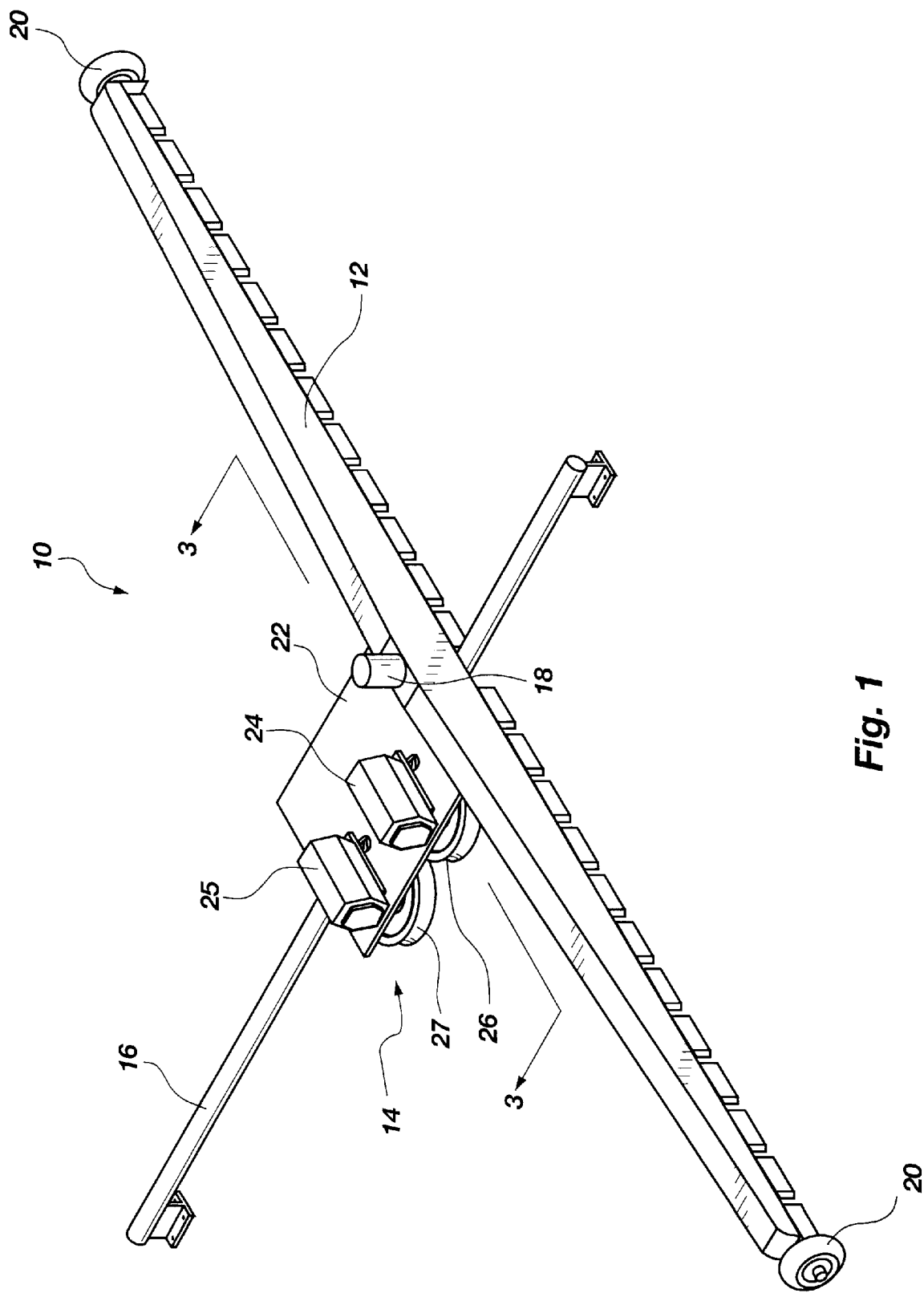
FIG. 1 is a perspective view of a settling basin suction housing utilizing first, second, and third embodiments of the propulsion mechanism of the present invention along a track attached to the bottom of a settling basin, the settling basin not shown.

Turning now to the drawings, and initially to FIG. 1, a first embodiment of a sludge vacuum device is shown in perspective, generally illustrated by the numeral 10, to comprise a suction housing 12 mounted directly to a trolley 14 designed to propel the suction housing along a track 16. Those skilled in the art will appreciate that the track 16 is to be permanently mounted on the bottom essentially flat surface of a sediment settling basin or tank used in the purification or treatment of water or other liquid (the settling basin is not shown in the drawings).

The suction housing 12 is essentially a conventional suction housing commonly used with present sludge vacuum systems. It therefore includes a plurality of suction openings along the bottom thereof (not shown) that draw the collected sediment and sludge thereinto in a customary manner. In this regard, the suction housing 12 also includes a suction pipe 18 to which a sludge vacuum hose (not shown) is connected. The suction housing 12 also includes support wheels 20 that support the ends of the suction housing a specified distance above the bottom of the settling basin and essentially parallel to the bottom of the settling basin.

The sludge vacuum trolley 14 is propelled along the track 16 by a propulsion mechanism comprising front and rear pneumatic rotary actuators 24, 25 that drive respective drive wheels 26, 27 in a manner to be described hereinbelow.

Figure 2:
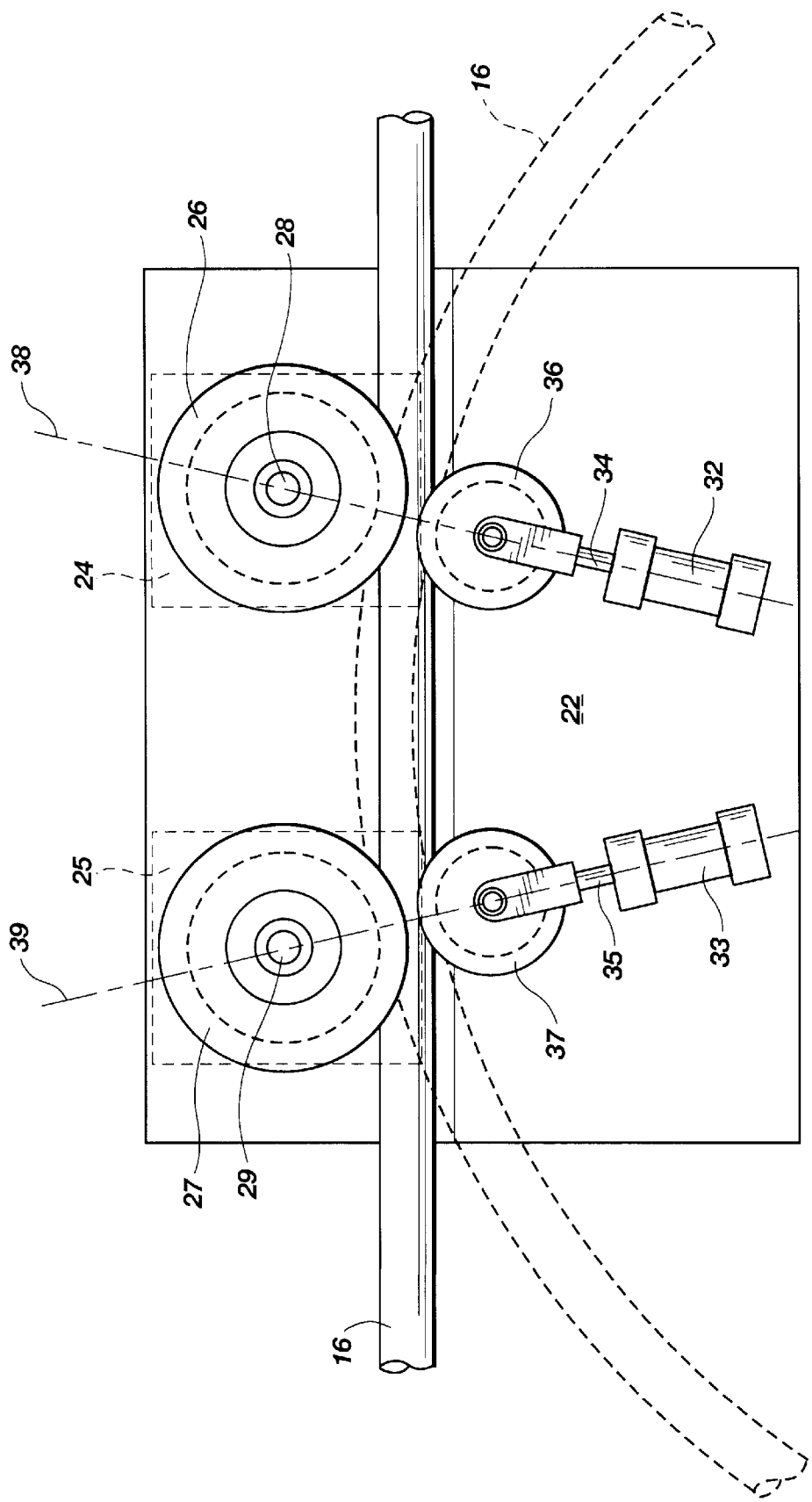
FIG. 2 is a bottom view of the first embodiment propulsion mechanism as shown in FIG. 1.
Figure 3:
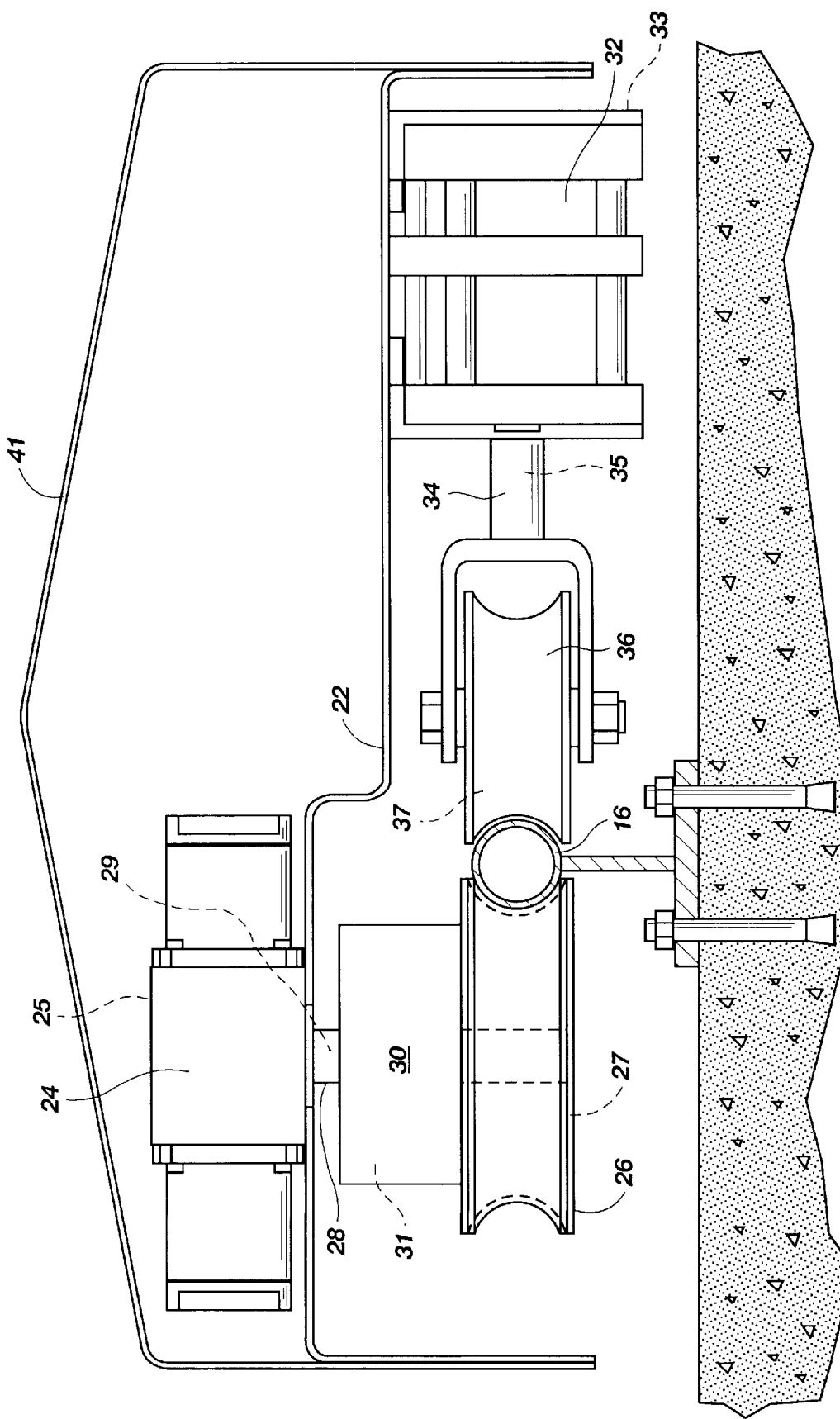
FIG. 3 is a front view of the first, second, and third embodiments of the propulsion mechanism.

FIG. 2 is a bottom view of the first embodiment sludge vacuum trolley, and more clearly illustrates its design and operation. Specifically, and with reference to FIGS. 2 and 3, the front and rear rotary actuators 24, 25 are mounted on the top side of a trolley base plate 22 in a manner to actuate (rotate) respective front and rear drive axles 28, 29 to rotate respective front and rear drive wheels 26, 27 through respective front and rear air clutches 30, 31 (the air clutches are best shown in FIG. 3). These pneumatic rotary actuators are the 90° rotation design, meaning that their outputs shafts (the drive axles 28, 29) rotate 90° with each surge of input pressurized air. Those skilled in the art will readily appreciate that 180° or 360° rotary actuators may also be used. The respective rotary actuators 24, 25 are hard-mounted to the trolley base plate 22, which forms the framework for the trolley propulsion mechanism.

The preferred embodiment propulsion mechanisms utilize air clutches 30, 31 that are of the positive engagement design that utilize mating toothed gears, rather than frictional surfaces, upon either the application or interruption of pressurized air to the clutch(es). Those skilled in the art will appreciate that the particular environment of intended use of the sludge vacuum device of the present invention is generally in a wide variety of slippery substances, in which environments friction clutches may not necessarily be effective. Therefore, toothed-gear, positive engagement air clutches are preferred. For purposes of explanation, these air clutches 30, 31 are designed to actuate (engage) upon the application of pressurized air, and disengage upon the removal of pressurized air.

As shown in FIGS. 2 and 3, front and rear clamping cylinders 32, 33 are mounted on the bottom of the trolley base plate 22 in a manner to permit their respective piston rods 34, 35 to urge respective front and rear idler wheels 36, 37 into engagement with the track 16 in order to frictionally engage the front and rear drive wheels 26, 27 with the track.

FIG. 3 also clearly shows that the track 16 takes the form of a cylindrical pipe or tube. Therefore, the outer circumferential surfaces of the drive wheels 26, 27 and the idler wheels 36, 37 are formed in concave cross-section in order to uniformly and completely engage as much of the side cylindrical surface of the track as possible. Those skilled in the art will also appreciate that tracks of square or rectangle cross-section can also be used, in which case the outer circumferential surfaces of the drive wheels and idler wheels would be formed in "C" cross-section, again, of course, to uniformly engage the track across their entire mating surfaces. In addition, of course, both of these configurations of track (cylindrical and square or rectangular), drive and idler wheel circumferential surfaces, and drive wheel circumferences are effective to stabilize the trolley 14 on the track and ensure positive and uniform engagement of each drive wheel against the track.

FIG. 2 illustrates that the front and rear clamping cylinders 32, 33 have their respective center axes 38, 39 in alignment with respective front and rear drive axles 28, 29, yet the clamping cylinder axes themselves are not parallel. The reason for this is to enable the sludge vacuum trolley to negotiate curved tracks, as shown by dotted track line in FIG. 2. Those skilled in the art will appreciate that the optimum angle that each clamping cylinder axis is offset from what would be normal to a straight track depends upon a number of factors—drive wheel diameter, idler wheel diameter, radius of curvature of the track, etc. In this regard, it should be pointed out that the preferred angle of the clamping cylinder axis relative to a plane normal to a straight track would likely be half way between (1) normal to the track and (2) the angle at which either clamping cylinder axis 38 or 39 would be coincident with the radius of curvature of the curved track at the location of maximum track curvature.

OPERATION OF FIRST EMBODIMENT

The operation of the first embodiment is as follows: With reference to FIGS. 2 and 3, (1) pressurized air is initially applied to the front drive wheel air clutch 30 and the front clamping cylinder 32. This engages the front drive wheel air clutch (engages the drive axle 28 to the drive wheel 26), and shifts the front idler wheel 36 toward the front drive wheel 26 and against the track 16 to frictionally engage the drive wheel to the track. With these air pressures maintained, (2) pressurized air is then applied to the front pneumatic rotary actuator 24, causing the front drive axle 28, and therefore the front drive wheel air clutch 30 and front drive wheel 26, to rotate 90° in the clockwise direction as shown in FIG. 2, in order to propel the sludge vacuum trolley forward (from left to right in FIG. 2, out of the paper in FIG. 3) a distance equal to one quarter of the circumference of the drive wheel. It should be noted that while the front driving mechanism is being actuated, there is no pressurized air supplied to the rear actuating mechanism (rotary actuator or clamping cylinder). Therefore, both rear wheels 27 and 37 are free to rotate or not, depending on the amount of any friction between the respective wheels and the track 16.

(3) Pressurized air is then supplied to the rear clamping cylinder 33 and rear drive wheel air clutch 31 prior to (4) the air pressure being released from the front rotary actuator 24. In this manner, the sludge vacuum trolley cannot slip in the reverse direction when pressurized air is released from the front rotary actuator to permit the front drive axle 28 to return (rotate in the counter-clockwise direction) to its original orientation.

With pressurized air supplied to the rear drive wheel air clutch 31 and clamping cylinder 33, (5) pressurized air is then applied to the rear pneumatic rotary actuator 25, causing it to rotate the rear axle 29 and the rear drive wheel 27, again in the clockwise direction, in order to propel the sludge vacuum trolley forward (left-to-right in FIG. 2) a distance equal to one quarter of the circumference of the drive wheel. Simultaneously with the application of pressurized air to the rear pneumatic rotary actuator 25, pressurized air is also applied to the front pneumatic rotary actuator 24 at its reverse-direction inlet (not specifically shown) in order to return (rotate in the reverse direction) the front rotary actuator and drive axle 28 to their original positions in preparation for their subsequent driving rotations. With no pressurized air applied to the front (right) air clutch 30, the front drive axle 28 readily rotates in its reverse direction back to its original orientation without affecting the forward propulsion of the trolley. Following that sequence, the sequence then repeats itself with the forward propulsion mechanism (rotary actuator 24, drive axle 28, air clutch 30, and drive wheel 26).

Those skilled in the art will readily appreciate that either the front or back propulsion mechanism can be used solely to propel the sludge vacuum trolley in one direction or the other, with the other (back or front) propulsion mechanism being used to propel the sludge vacuum trolley in the opposite direction, rather than have both front and back propulsion mechanisms propel the sludge vacuum trolley in both directions, as just-described. In this regard, the air clutches can be replaced with mechanical roller clutches, which are "directional" roller bearings that permit the respective drive wheel to (1) engage with the drive axle when the drive axle is actuated in the forward direction, and (2) free-wheel or slip when the drive axle is actuated in its reverse direction. Those skilled in the art will also readily appreciate that resequencing the pressurized air to the drive wheel clutches 30, 31, clamping cylinders 32, 33, and pneumatic rotary actuators 24, 25 from that just-described will result in reversing the direction of movement of the sludge vacuum trolley (i.e., from right to left as shown in FIG. 2).

When the sludge vacuum trolley has reached the end of the track 16, censors may be provided to automatically re-sequence the surges of pressurized air to the drive wheel air clutches 30, 31, clamping cylinders 32, 33, and pneumatic rotary actuators 24, 25 in order to propel the sludge vacuum trolley in the opposite direction, i.e., from right to left, as shown in FIGS. 1 and 2.

SECOND EMBODIMENT

Figure 4:
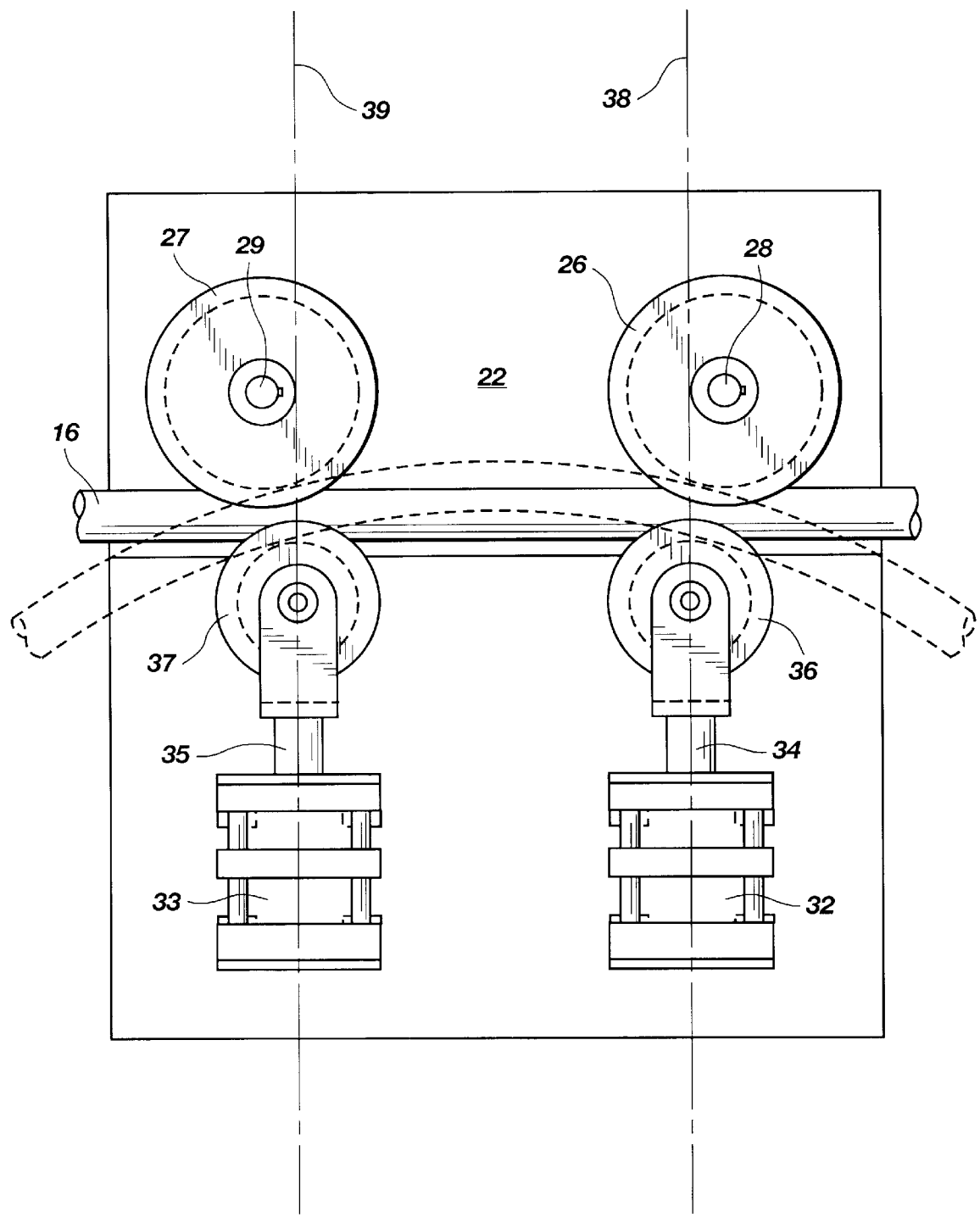
FIG. 4 is a bottom view of the second embodiment propulsion mechanism.

FIG. 4 is a bottom view of a second embodiment of the sludge vacuum propulsion mechanism of the present invention. It is essentially identical to the first embodiment, and therefore identical parts will have like reference numerals. Comparing the first embodiment as shown in FIG. 2 with the second embodiment as shown in FIG. 4, the difference is that the clamping cylinder axes 38, 39 are not in alignment with respective front and rear drive axles 28, 29, but rather are offset therefrom. In addition, the clamping cylinder axes 38, 39 are parallel to each other, with the offset between the clamping cylinder axes and the respective drive axles 28, 29 being provided in order to accommodate curvatures in the track 16, as discussed relating to the first embodiment and shown in FIG. 2. Those skilled in the art will readily appreciate that this offset between the clamping cylinder axes and drive axles will permit the sludge vacuum trolley to readily negotiate a curved track 16, as shown in dotted lines in FIG. 4.

The operation of the second embodiment is identical to that of the first embodiment.

THIRD EMBODIMENT

Figure 5:
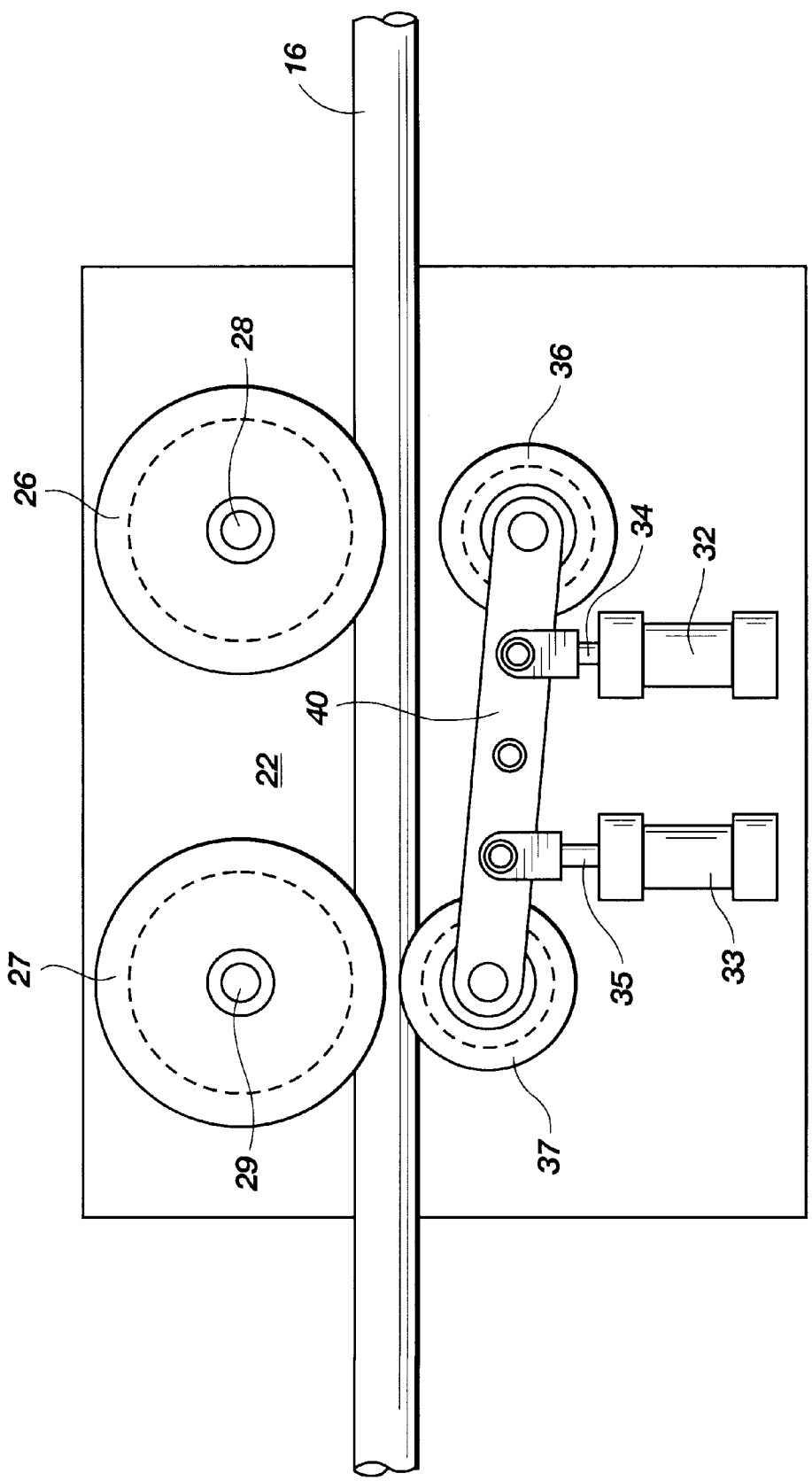
FIG. 5 is a bottom view of the third embodiment propulsion mechanism.

FIG. 5 is a bottom view of a third embodiment of the sludge vacuum trolley of the present invention. It is very similar to the first and second embodiments, the difference being that the front and rear idler wheels 36, 37 are rotatably mounted on a bracket 40, that is supported by the front and rear clamping cylinder piston rods 34 and 35. Those skilled in the art will readily appreciate that actuation of the front clamping cylinder 32 will shift the front idler wheel 36 directly toward the front drive wheel 26 to clamp the track 16 therebetween so that the front drive wheel can propel the trolley in either direction. Likewise, actuation of the rear clamping cylinder will shift the rear idler wheel 37 directly toward the rear drive wheel 27, clamping against the track 16 so that the rear drive wheel can propel the trolley along the track.

Operation of the third embodiment of the sludge vacuum trolley is essentially identical to that of the first and second embodiments.

Those skilled in the art will appreciate that the propulsion mechanism first, second, and third embodiments can have the air clutches replaced with roller clutches, and each drive wheel oriented to drive the trolley in the opposite direction from that of the other drive wheel. Specifically, the drive axles 28, 29 can have mounted thereon roller clutches, which are one-way rotational bearing assemblies that permit relative rotation in one direction and prevent relative rotation in the opposite direction. The roller clutch can be formed in or as part of the respective drive wheel 26, 27 in a manner that each drive wheel rotates in only one direction. Each drive wheel can be oriented to drive the trolley in the opposite direction from the other drive wheel. Specifically, and with reference to FIG. 2, for example, the right drive wheel 26 rotates only in the clockwise direction, and the left drive wheel 27 rotates only in the counter-clockwise direction. Because of the fact that the opposite clamping cylinder 32 or 33 is fully released when each drive wheel is engaged and driving the trolley, the non-driving wheel and its idler wheel are not clamped against the track, and therefore do not impart any rolling resistance. Therefore, the fact that the roller clutch prevents the non-driving wheel from rotating in the driving (at the time) direction is of no importance. When the first three embodiments utilize roller clutched rather than air clutches, therefore, a skilled artisan can resequence the pressurized air so that each drive wheel drives the trolley in only one direction, and the other drive wheel drives the trolley in the opposite direction.

FOURTH EMBODIMENT

Figure 6:
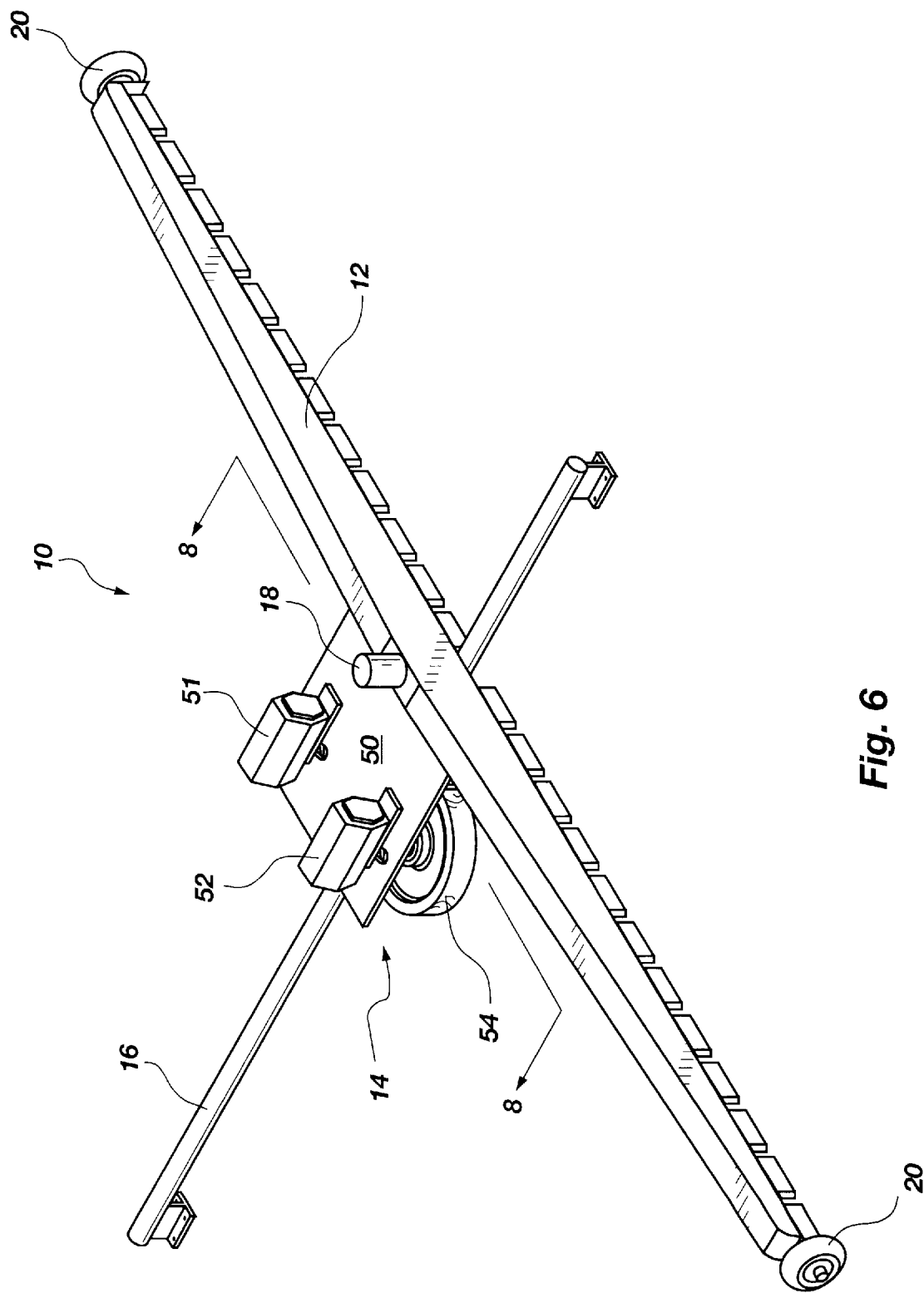
FIG. 6 is a perspective view similar to FIG. 1, illustrating the configuration of the fourth and fifth embodiments of the present invention.

FIG. 6 is a perspective view of the fourth and fifth embodiments of the sludge vacuum propulsion mechanism. As shown, the basic difference between the overall configurations of the first-second-third embodiments (FIGS. 1–5) and the fourth-fifth embodiments (FIGS. 6–12) is that the drive mechanisms (pneumatic rotary actuators, drive axles, clutches, and drive wheels) are positioned on the sides of the track (one drive mechanism on each side of the track) in the fourth and fifth embodiments, rather than both drive mechanisms being positioned on the same side of the track, as in the first-third embodiments. In addition, the idler wheels have been eliminated in the fourth and fifth embodiments, in favor of the non-driving wheel serving as the idler wheel to the driving wheel during the propulsion sequences.

As shown in FIG. 6, the trolley 14 comprises a trolley base plate 50 on which are mounted for slight pivotal movement, right and left pneumatic rotary actuators 51, 52, in a manner to drive respective right and left drive wheels 53, 54 to propel the trolley along the track.

Figure 7:
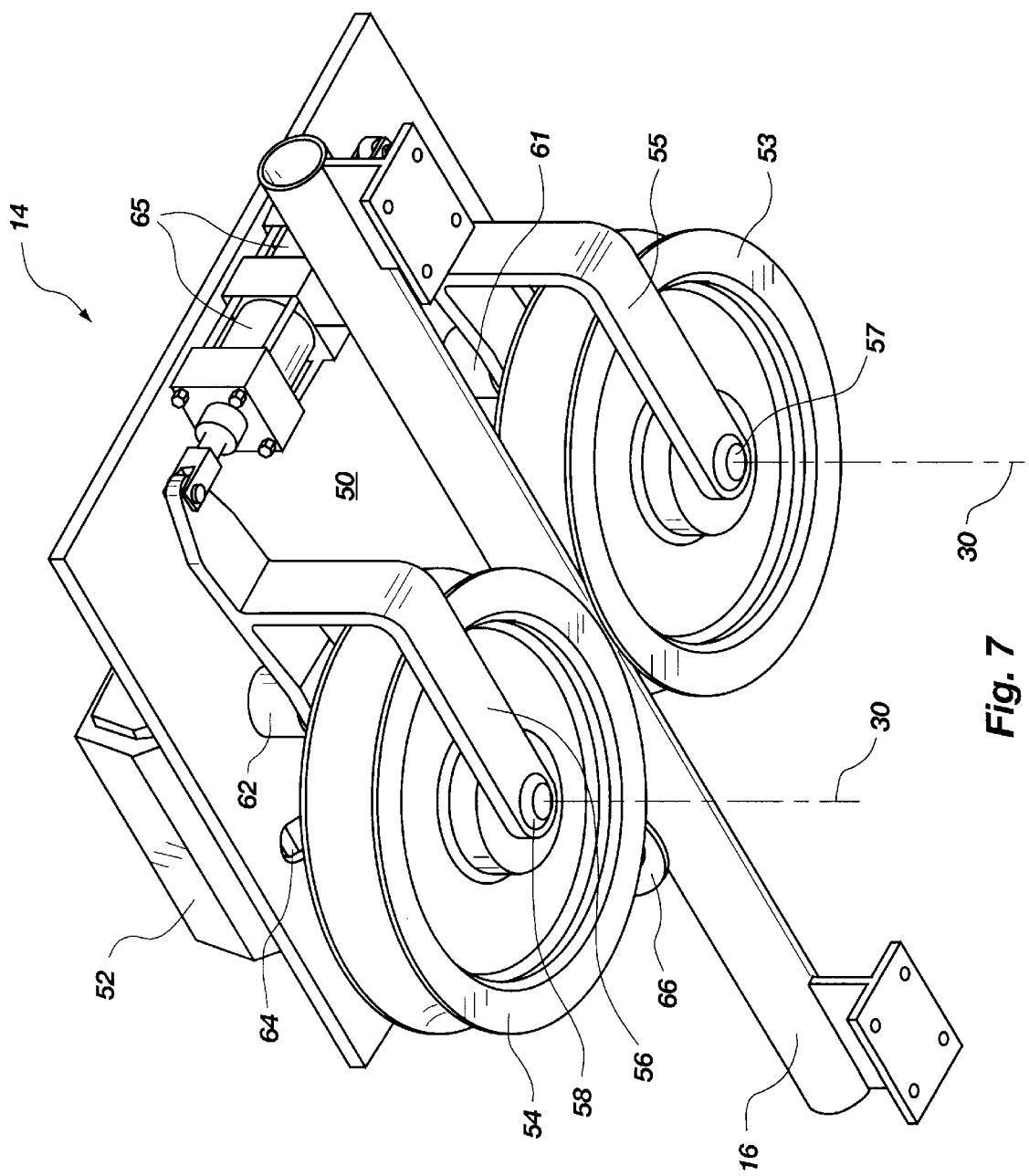
FIG. 7 is a perspective view of the fourth or fifth embodiment propulsion mechanism shown in FIG. 6, taken from below the device, and uninstalled, in order to better illustrate the drive wheels.

FIG. 7 more clearly shows the design of the trolley portion of the fourth embodiment sludge vacuum device. The drive wheels 53, 54 are mounted in respective right and left drive wheel brackets 55, 56 for rotation about respective drive wheel axles 57, 58. As can be appreciated, the respective drive wheels 53, 54 are rotatably connected to respective pneumatic rotary actuators 51, 52 at their rotation axles 57, 58 through respective air clutches 59, 60 (shown more clearly in FIG. 8). These air clutches 59, 60 are designed to be actuated by pressurized air either to engage or disengage, depending on the particular application. In this particular application, either type may be utilized, and the pressurized air sequence to the drive wheel air clutches 59, 60 and their respective pneumatic rotary actuators 51, 52 adjusted accordingly.

For purposes of explanation, however, the air clutch clutches will actuate (engage) upon the application of pressurized air.

The brackets 55, 56 are pivotally mounted to the trolley base plate 50 at respective bracket pivot mounts 61, 62. Those skilled in the art will also appreciate that the pneumatic rotary actuators 51, 52 are also connected to respective brackets 55, 56 via the pivot mounts 61, 62 so that the pneumatic rotary actuators pivot with the drive wheel brackets for reasons to be explained hereinbelow. In this regard, respective drive axles 57, 58 that connect the pneumatic rotary actuators 51, 52 with the respective drive wheels 53, 54 pass through the trolley base plate 50 in respective arcuate slots 63, 64 in a manner such that the respective pneumatic rotary actuators are always in direct connection with respective drive wheels, regardless of variations in pivot orientation of the drive wheel brackets about respective pivot mounts 61, 62.

Those skilled in the art will appreciate that the purpose of pivoting the drive wheel brackets 55, 56 about the pivot mounts 61, 62 is to be able to control the force of the drive wheels against the track, and therefore control the friction between the drive wheels and track in order to propel the trolley along the track. To this end, the trolley base plate 50 includes a double-piston pneumatic clamping cylinder 65 for biasing the respective drive wheel brackets about the pivot points, thereby biasing the respective drive wheels into frictional engagement with the track 16 in order to propel the trolley and sludge vacuum device along the path of the track.

As the trolley 14 is propelled along the track 16, it is essentially "guided" along the track by a guide wheel 66 positioned on the underside of the trolley base plate 50 so as to travel along the upper surface of the track 16, and maintain the trolley in proper functional (i.e., straight) position relative to the track. As better shown in FIG. 10, the guide wheel 66 is mounted in a guide wheel swivel bracket 67 in a manner to rotate about a horizontal axis essentially parallel to the plane of the trolley base plate 50 and normal to the axis of the track 16. As can be appreciated, the weight of the trolley and suction housing 12 biases the guide wheel 66 down into proper engagement with (i.e. on) the track in order to insure proper direction of travel of the sludge vacuum trolley on the track.

Figure 8:
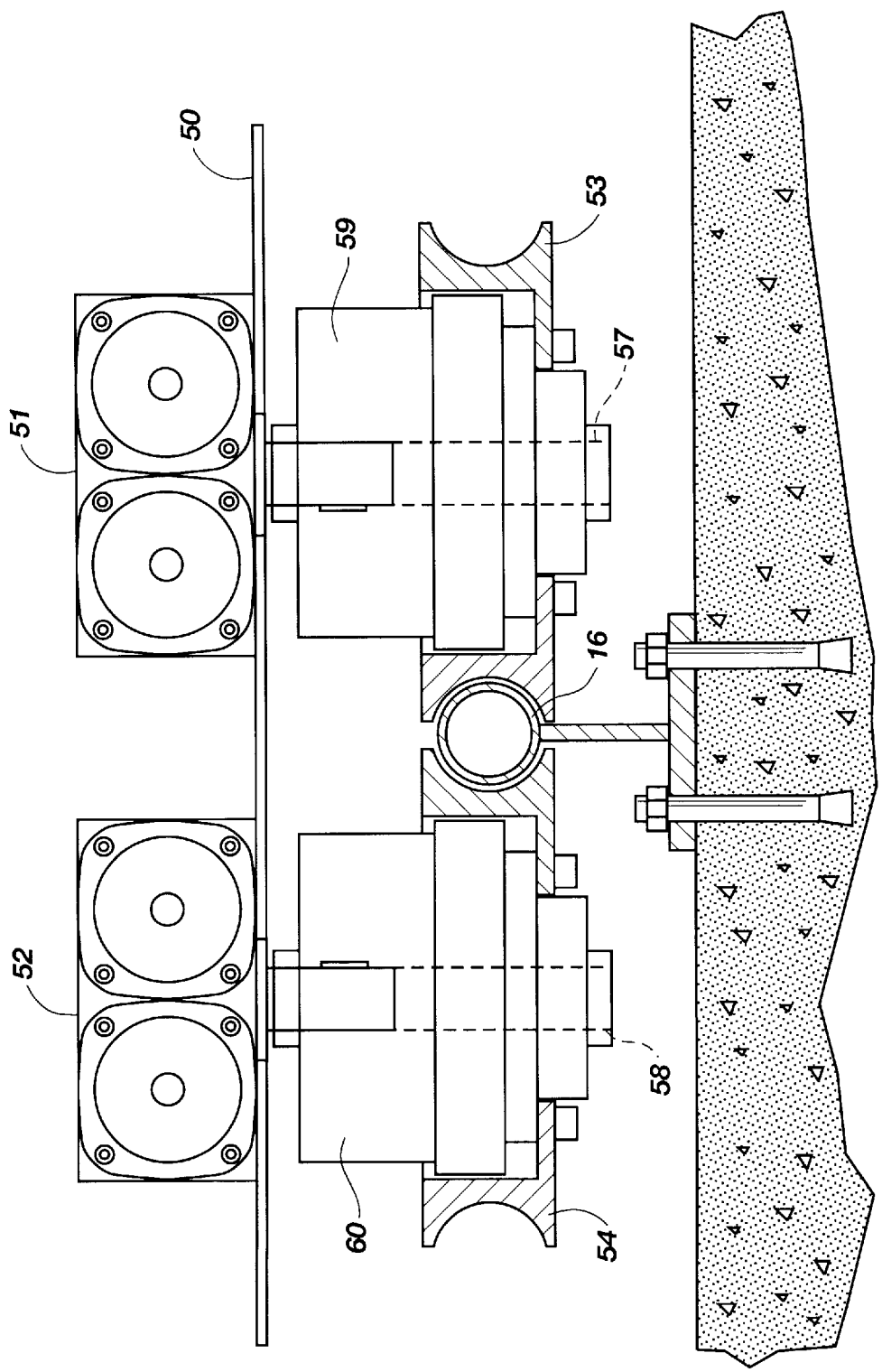
FIG. 8 is a vertical sectional view, taken in the direction of arrows 8—8 in FIG. 6, illustrating details of the driving mechanism of the fourth embodiment propulsion mechanism of the present invention.

FIGS. 7 and 8 also clearly show that the track 16 takes the form of a cylindrical pipe or tube. Therefore, the outer circumferential surfaces of the drive wheels 53, 54 and the guide wheel 66 are formed in concave cross-section in order to uniformly and completely engage as much of the side cylindrical surface of the track as possible. As previously explained with reference to the first, second, and third embodiments, tracks of square or rectangle cross-section can also be used, in which case the outer circumferential surfaces of the drive wheels would be formed in "C" cross-section, again, of course, to uniformly engage the track across their entire mating surfaces. In addition, of course, both of these configurations of track (cylindrical and square or rectangular), drive wheel circumferential surfaces, and drive wheel circumferences is effective to stabilize the trolley 14 on the track and ensure positive and uniform engagement of each drive wheel against the track. FIG. 8 also illustrates a sheet metal enclosure or cover 41 that shields the drive wheels, clutches, and track from accumulated sediment and sludge that otherwise accumulates in the bottom of the sediment collecting basin.

Figure 9:
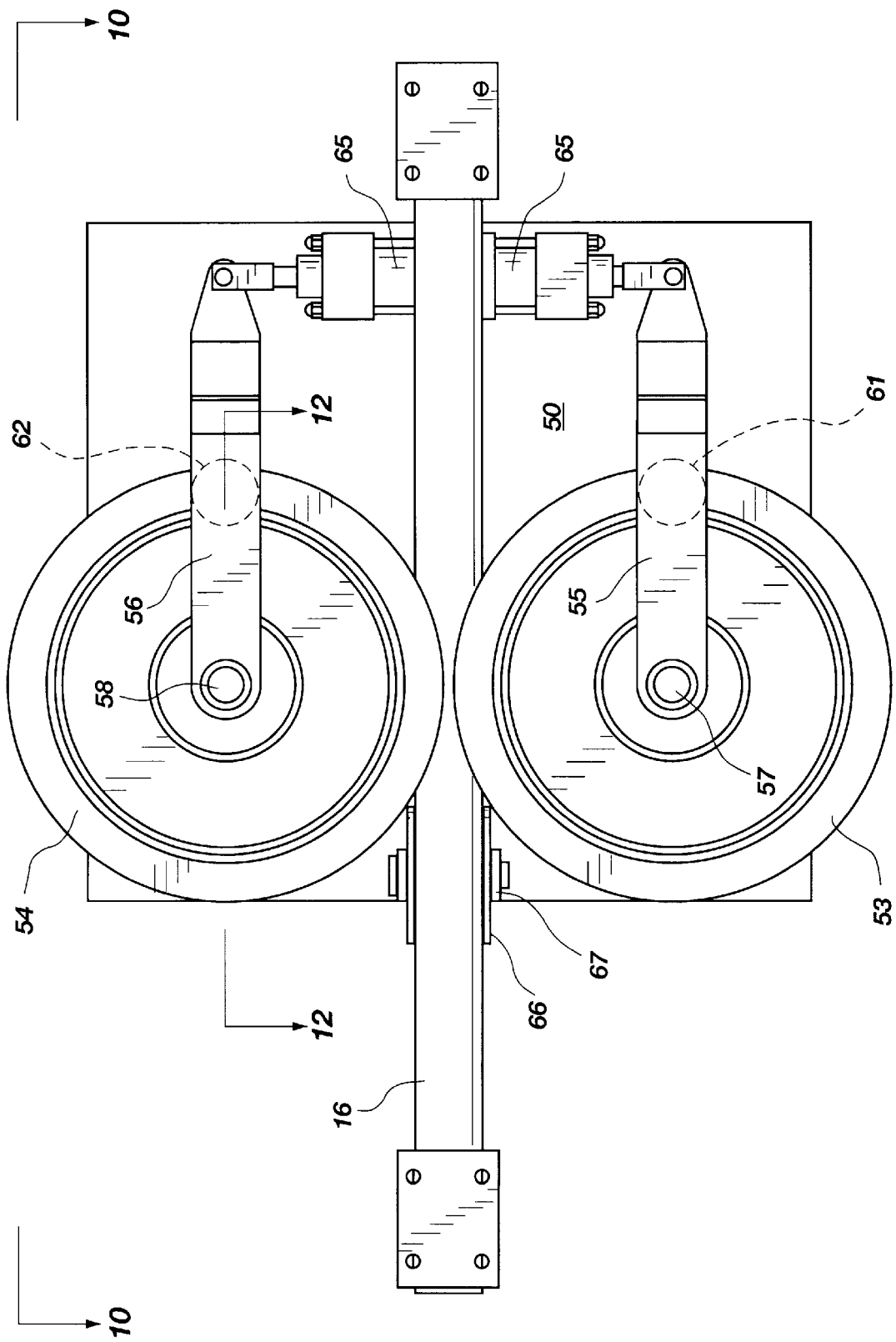
FIG. 9 is a bottom view of the fourth or fifth embodiment propulsion mechanism as shown in FIG. 6.

FIG. 9 is a bottom view of the trolley and drive wheel mechanism of the fourth embodiment sludge vacuum device of the present invention, and more clearly illustrates the degree of potential pivot of drive wheel 53, 54 about its respective pivot mount 61, 62. In particular, FIG. 9 illustrates how the clamping cylinder 65 acts to bias the respective drive wheels into engagement with the track. Such bias is preferable to effect complete and uniform contact between the wheels and the track in order to ensure that the trolley is uniformly pulled along the track without slipping. Those skilled in the art will appreciate that, in a sediment and sludge environment, the track and drive wheels are constantly exposed to sediment and sludge that tends to collect and build up on the mating surfaces of the track and drive wheels, causing slippage therebetween. The bias mechanism provided by the clamping cylinder 65 eliminates the effect of this build up of slippery sludge and sediment on the track and drive wheels by (1) squeezing the sludge and sediment from between the contacting surfaces of the track and drive wheels, and (2) increasing the frictional driving force between the rail and drive wheels.

The pneumatic rotary actuators 51, 52 of the fourth embodiment are conventional reciprocating rotary actuators having reciprocating rotating or pivoting output in response to pressurized air input. In particular, these pneumatic rotary actuators also incorporate pressurized air return to their initial orientations upon the application of pressurized air to their "return" or "reverse" air inputs (not specifically illustrated), so that rotation of the respective drive wheels will propel the trolley along the track in the prescribed manner as described hereinbelow.

OPERATION OF FOURTH EMBODIMENT

The fourth embodiment of the sludge vacuum trolley operates as follows:

For purposes of explanation, the drive wheel air clutches 59, 60 will be of the design that engage upon the application of pressurized air and disengage (i.e., free-wheel) with the cessation of pressurized air to their return air inputs. (1) Pressurized air is initially applied to the clamping cylinder 65 to shift both drive wheels into clamping engagement with the track, and is maintained throughout the propulsion process. (2) Pressurized air is then applied to the right (lower as shown in FIG. 9) drive wheel air clutch 59 in order to engage the right drive axle 57 with the right drive wheel 53. With the air pressure being maintained at the right (lower) drive wheel air clutch 59, (3) pressurized air is then supplied to the right (lower) pneumatic rotary actuator 51, causing it to rotate the right drive axle 57 and right drive wheel 53 90° in the counter-clockwise direction, as viewed in FIG. 9. Inasmuch as the left (upper) drive wheel air clutch 60 is not actuated, it free-wheels, thereby permitting the left (upper) drive wheel 54 to serve as an idler wheel, which rotates 90° in the clockwise direction, as viewed in FIG. 9. After the right (lower) pneumatic rotary actuator 51 has rotated the axle 57 and drive wheel 53 90°, thereby propelling the sludge vacuum trolley to the right as shown in FIGS. 6, 8, 9, and 10 a distance equal to one-quarter of the circumference of the drive wheel, (4) air pressure is released from the right drive wheel air clutch, and (5) immediately applied to the left (upper) drive wheel air clutch, in order to temporarily hold the sludge vacuum trolley in position on the track. (6) Next, air pressure is released from the right (lower) pneumatic rotary actuator 51 and right air clutch 59, and simultaneously therewith, (7) pressurized air is applied to the return or reverse air input (not specifically illustrated) of the right (lower) pneumatic rotary actuator 51, to pivot the right drive axle 57 90° clockwise to its original position. With the right air clutch disengaged, the right drive wheel 53 does not rotate clockwise with the right drive axle, but rather is maintained in its present orientation by the action of the right drive wheel 53 and left drive wheel 54 being "clamped" against the track, the left (upper) air clutch 59 being engaged to hold the left drive wheel stationary. (8) Essentially immediately thereafter, pressurized air is applied to the left (upper) pneumatic rotary actuator 52, rotating the drive axle 58 and therefore the left drive wheel 54 90° in the clockwise direction, thereby propelling the sludge vacuum trolley again to the right for a distance equal to one-quarter of the circumference of the drive wheel. In this instance, of course, the right drive wheel 53, having its air clutch disengaged, serves as an idler wheel. This sequence of applications of pressurized air to the right and left pneumatic rotary actuators and right and left drive wheel air clutches propels the sludge vacuum system incrementally from right to left as shown in FIG. 9, in incremental distances of one-quarter of the circumference of the drive wheels.

When the sludge vacuum trolley has reached the end of the track 16, censors may be provided to automatically re-sequence the blasts of pressurized air to the drive wheel air clutches 59, 60 and pneumatic rotary actuators 51, 52 in order to propel the sludge vacuum trolley in the opposite direction, i.e., from right to left, as shown in FIG. 9.

Those skilled in the art will readily appreciate that in the just-described sequence of pressurized air applications to propel the sludge vacuum trolley from left to right, both pneumatic rotary actuators 51 and 52 and both drive wheels 53 and 54 are used to propel the sludge vacuum trolley. It should also be appreciated that the sludge vacuum trolley can be propelled in either direction by the use of only one pneumatic rotary actuator and drive wheel, the opposite drive wheel simply serving as an idler wheel. Specifically, the sequence of pressurized air applications to the sludge vacuum trolley would be first to either drive wheel air clutch (the right air clutch 59, for example), to engage the wheel with the drive axle, followed by a second application of pressurized air to the right pneumatic rotary actuator 51 to drive it in the appropriate rotational direction. Again, release of air pressure to the rotary actuator and drive wheel air clutch permits the drive wheel to free-wheel relative to the drive axle 57 and simultaneously permits the rotary actuator to be returned to its original position, whereupon the sequence could be repeated to drive the sludge vacuum trolley again in an incremental distance along the track. If necessary, at the time the air pressure is released from the right (lower) pneumatic rotary actuator and air clutch, pressurized air could be applied to the left (upper) drive wheel air clutch 60 in order to prevent the sludge vacuum trolley from slipping in the reverse direction as the right (lower) drive axle 57 is returned to its original position.

Those skilled in the art will readily appreciate that, again, the sequence of pressurized air applications to the specific drive wheel air clutch and pneumatic rotary actuator will determine which direction the sludge vacuum trolley is propelled within the sediment collecting basin.

FIFTH EMBODIMENT

A fifth embodiment of the sludge vacuum trolley of the present invention has the same outward physical configuration as the fourth embodiment as illustrated in FIGS. 6–11.

Figure 10:
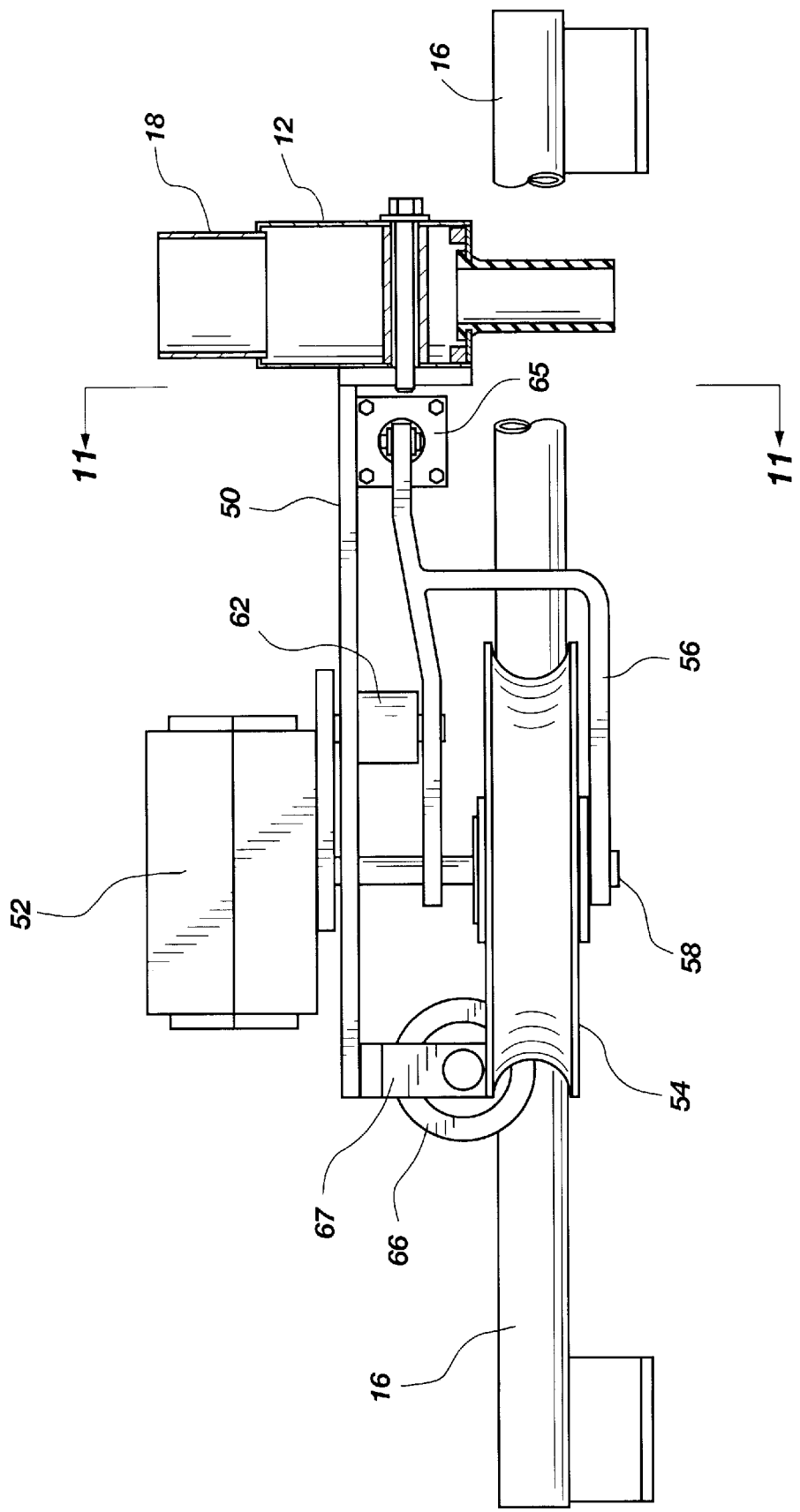
FIG. 10 is a side view of the fifth embodiment propulsion mechanism taken in the direction of arrows 10—10 in FIG. 9.

Therefore, identical parts will be referenced with the same reference numerals. The difference in the fourth and fifth embodiments is shown in FIGS. 8 and 10. In the fourth embodiment shown in FIG. 8, the respective drive wheels 53, 54 are attached to respective drive axles 57, 58 by respective air clutches 59, 60. In the fifth embodiment shown in FIGS. 10 and 12, the drive wheels are driven by respective roller clutches 68, 69 mounted into the drive wheels about respective drive axles. The roller clutches 68, 69 are more clearly shown in FIG. 12. The roller clutches 68, 69 are not shown in FIG. 10 because they are set into, and form part of, respective drive wheels 53, 54. Aside from this difference, the fifth embodiment of FIG. 8 is essentially identical to the fourth embodiment illustrated in FIGS. 2–5.

Figure 12:
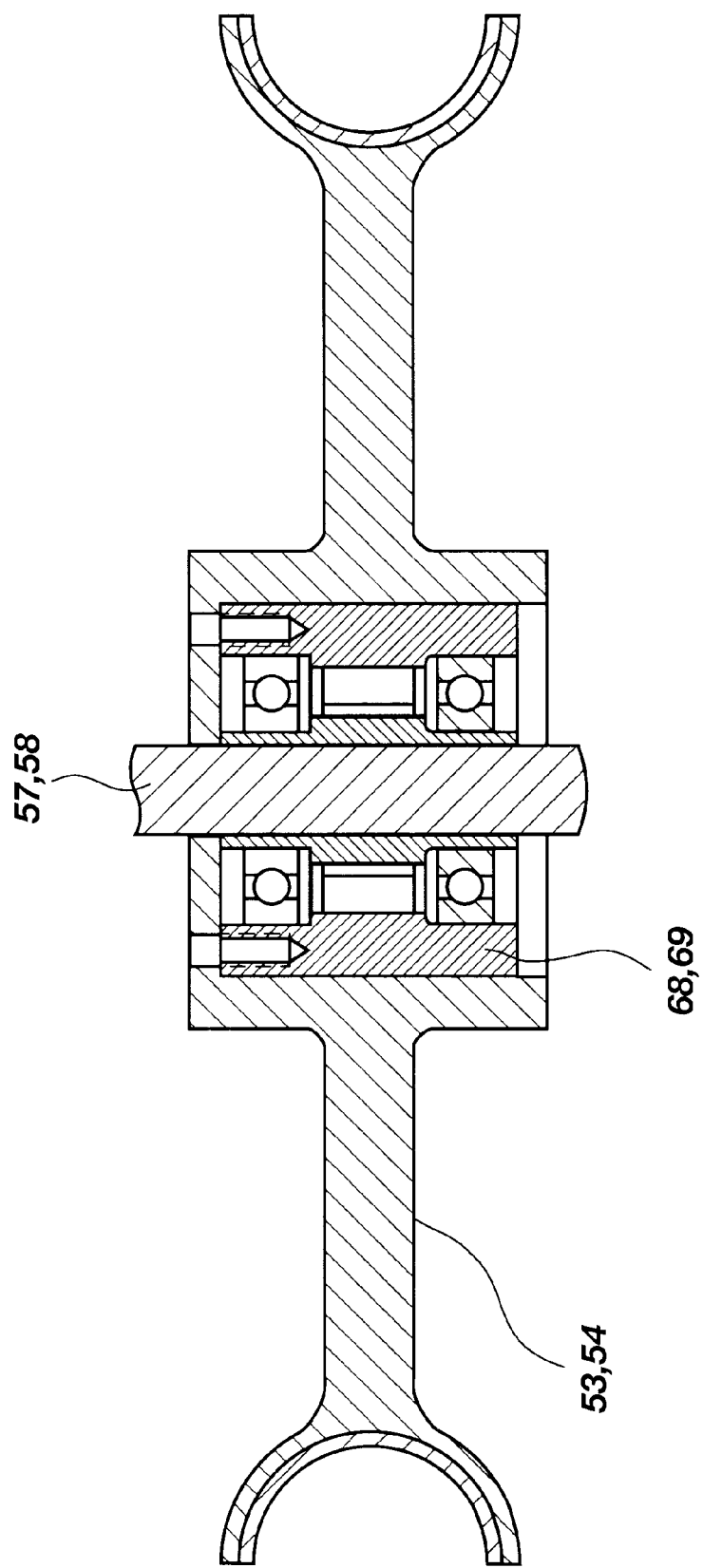
FIG. 12 is a partial vertical sectional view of the drive axle, roller clutch mechanism, and drive wheel of the fifth embodiment propulsion mechanism, taken in the direction of arrows 12—12 in FIG. 9.

FIG. 12 more clearly shows the methodology incorporated into the drive wheels of the fifth embodiment. Specifically, the pneumatic rotary actuators 51, 52 drive the drive axles 57, 58 on which are mounted the roller clutches 68, 69, one-way rotational bearing assemblies that permit relative rotation in one direction and oppose relative rotation in the opposite direction. The roller clutch 68, 69 is formed in or as part of the respective drive wheel 53, 54 in a manner that each drive wheel rotates in only one direction, that direction being to propel the trolley 14 to the right in FIGS. 1–4 and 7. Specifically, and with reference to FIG. 9, the upper (left) drive wheel 54 rotates in the clockwise direction, and the lower (right) drive wheel 53 rotates in the counter-clockwise direction.

OPERATION OF FIFTH EMBODIMENT

The operation of the fifth embodiment sludge vacuum device is quite similar to that of the fourth embodiment, with the following differences. Because the fourth embodiment utilizes drive wheel air clutches (which are not directional), rather than drive wheel roller clutches (which are directional), the fourth embodiment of the sludge vacuum trolley can be driven in either direction, i.e., back and forth along the track in an essentially rectangular sediment collecting basin.

The right (lower) rotary actuator 51, drive wheel 53, and drive axle 57 have the roller clutch 68 oriented such that the roller clutch locks the drive wheel to the axle whenever the actuator is rotated in the counter-clockwise direction, as shown in FIG. 9, and unlocks, or otherwise is free-wheeling, when the actuator is rotated in the clockwise direction back to its original position. The roller clutch 69 in the left (upper) drive wheel 54 and drive wheel axle 58 is oriented such that it locks or engages whenever the left (upper) rotary actuator 52 is actuated in the clockwise direction, and releases when the actuator is rotated in the counter-clockwise direction back to its original position. In this manner, as the right (lower) drive wheel 53 is actuated and driven in the counter-clockwise direction, the vacuum device trolley 14 is driven along the track 16 in the left-to-right direction as shown in FIG. 9. Because of the orientation of the left (upper) roller clutch 69, as the vacuum device trolley 14 moves from left to right, the left (upper) drive wheel 54 freely rotates in the clockwise direction.

Figure 11:
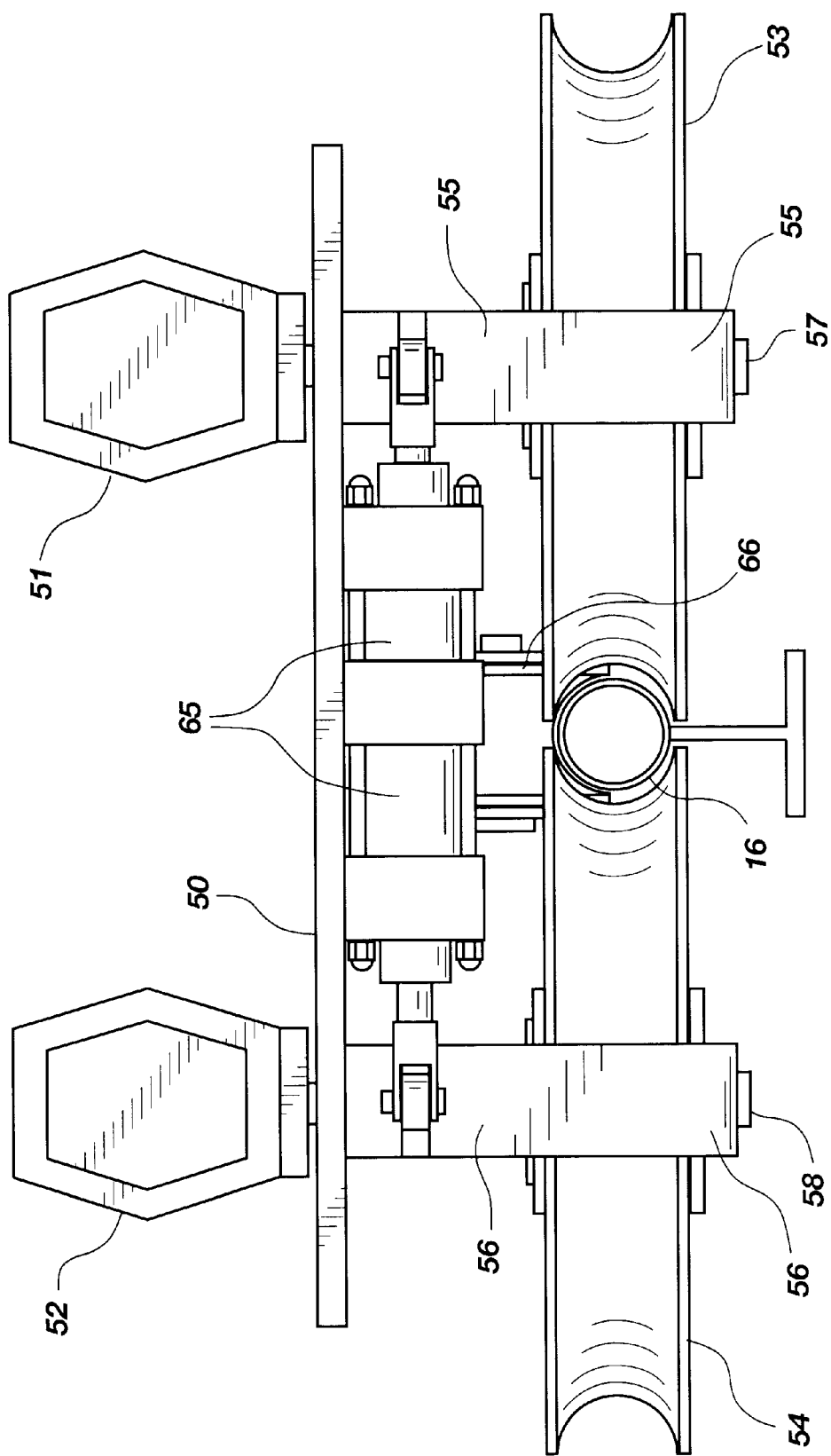
FIG. 11 is a front view of the fifth embodiment propulsion mechanism taken in the direction of arrows 11—11 in FIG. 10.

This single direction rotation of each drive wheel is effected by the pneumatic rotary actuators and respective roller clutches as follows: with reference to FIGS. 9, 10, and 11, (1) the right (lower) pneumatic rotary actuator 51 (shown in FIG. 11, but not FIGS. 9 or 10) is actuated to rotate its respective drive axle 57 in the counter-clockwise direction (as shown in FIG. 9) for one-quarter turn (90°) with each input application of pressurized air. The roller clutch 68 is oriented to lock when the right (lower) drive axle 57 is rotated in the counter-clockwise direction; therefore, the roller clutch locks rotational movement between the drive axle 57 and drive wheel 53, thereby rotating the right (lower) drive wheel 90°0 in the counter-clockwise direction, as shown in FIG. 9.

(2) Secondly, the left (upper) pneumatic rotary actuator 52 (shown in FIGS. 9 and 11, but not FIG. 10) is actuated to rotate its respective drive axle 58 in the clockwise direction (as shown in FIG. 9) for one-quarter turn (90°) with each input surge of pressurized air. The roller clutch 69 is oriented to lock when the left (upper) drive axle 58 is rotated in the clockwise direction; therefore, the roller clutch locks rotational movement between the left (upper) drive axle 58 and drive wheel 54, thereby rotating the left (upper) drive wheel 90° in the clockwise direction, as shown in FIG. 9 when pressurized air is applied to the left (upper) pneumatic rotary actuator 52.

The two pneumatic rotary actuators 51, 52 are "air-return", meaning that when pressurized air is applied to the return air inputs, the respective drive axles 57, 58 rotate 90° in their respective opposite directions in order to return to their original positions. In order to propel the trolley along the track, therefore, pressurized air is alternately applied between the two pneumatic rotary actuators in a timed sequence such that, following the application of pressurized air to one rotary actuator, it is immediately applied to both the other rotary actuator and to the return air input of the other actuator, in order to return the respective drive axle 57, 58 to its original position, simultaneously with the 90° rotation of the drive axle of the opposite drive wheel that propels the trolley forward (to the right in FIG. 9) a distance approximating one-quarter of the circumference of the drive wheel. Those skilled in the art will readily appreciate that each drive axle will be returned to its original position as the opposite drive axle is driving its respective drive wheel to propel the trolley. The roller clutches, of course, operate to permit the respective drive axles 57, 58 to be returned to their original position without backing up their respective drive wheels. In point of fact, as each drive axle 57, 58 is returned to its original position (a 90° reverse rotation relative to the rotary actuator), its respective drive wheel is serving as an idler wheel to the opposite wheel, and rotates 90° in the forward direction as the opposite drive wheel propels the trolley forward. Therefore, within each cycle of operation, each drive wheel actually rotates 180° in the forward direction relative to its respective drive axle. In this manner, the trolley drive wheels alternately propel the trolley along the track in alternating sequential, yet essentially continuous, incremental 90° rotations of the drive wheels.

In operation, the clamping cylinder 65 has continuous pressurized air applied thereto in order to continuously bias both drive wheels toward each other and against the track 16. In this manner, force is always transmitted from the drive wheels to the track to insure sufficient frictional resistance therebetween such that the drive wheels can propel the trolley along the track, regardless of any build-up of sediment and sludge on the track or drive wheels. The clamping cylinder 65 functions to cause the drive wheels to press together to squeeze any accumulated sediment and sludge out from between the track and drive wheels as the trolley is propelled along the track.

The fifth embodiment propulsion mechanism is designed to travel in only one direction. Therefore, it should be used in a settling basin having a continuous track, as in a circular or oval track.

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. For example, the pneumatic rotary actuators may be replaced with air motors and gear-reduction transmissions (pinion gear mechanism, for example), that operate to propel the sludge vacuum trolley in the appropriate direction in a uniform manner and at a uniform speed, as opposed to the incremental, step-wise movements of the sludge vacuum trolleys of the designs illustrated and described herein. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

PARTS LIST 10 sludge vacuum device
12 suction housing
14 trolley
16 track
18 suction pipe
20 support wheels
24 front pneumatic rotary actuator
25 rear pneumatic rotary actuator
26 front drive wheel
27 rear drive wheel
28 front drive axle
29 rear drive axle
30 front drive wheel air clutch
31 rear drive wheel air clutch
32 front clamping cylinder
33 rear clamping cylinder
34 front clamping cylinder piston rod
35 rear clamping cylinder piston rod
36 front idler wheel
37 rear idler wheel
38 front clamping cylinder axis
39 rear clamping cylinder axis
40 bracket
41 sheet metal enclosure (cover)
50 trolley base plate
51 right pneumatic rotary actuator
52 left pneumatic rotary actuator
53 right drive wheel
54 left drive wheel
55 right drive wheel bracket
56 left drive wheel bracket
57 right drive wheel axle
58 left drive wheel axle
59 right drive wheel air clutch
60 left drive wheel air clutch
61 right bracket pivot mount
62 left bracket pivot mount
63 right arcuate slot
64 left arcuate slot
65 clamping cylinder
66 guide wheel
67 guide wheel swivel bracket
68 right drive wheel roller clutch
69 left drive wheel roller clutch

What is claimed is:

1. Apparatus for propelling a vacuum nozzle along the bottom of a liquid vessel adjacent a track, the apparatus comprising:
   a frame;
   first and second drive wheels rotatably mounted to the frame about respective wheel rotation axes;
   first and second rotational actuators mounted to the frame for driving respective drive wheels; and
   biasing means mounted to the frame for biasing the drive wheels into engagement with the track;
   whereby the rotational actuators drive respective drive wheels in order to propel the apparatus along the track.

2. Apparatus as set forth in claim 1, wherein the track is circular in cross-section, having an outer cylindrical surface.

3. Apparatus as set forth in claim 2, wherein the respective drive wheels have concave-semi-circular circumferences in order that the wheel circumferences will optimally engage the outer cylindrical surface of the track.

4. Apparatus as set forth in claim 1, wherein the biasing means comprises a pneumatic cylinder and piston mechanism.

5. Apparatus as set forth in claim 1, wherein the rotational actuators are air-driven.

6. Apparatus as set forth in claim 1, wherein respective rotational actuators are hard-mounted directly to the frame.

7. Apparatus as set forth in claim 1, further comprising guide means mounted to the frame for guiding the apparatus along the track.

8. Apparatus as set forth in claim 7, wherein the guide means comprises a guide wheel mounted to the frame for rotation along the track.

9. Apparatus as set forth in claim 1, further comprising directional rotation means for permitting the drive wheels to rotate in one direction only and preventing rotation of the drive wheels in the opposite rotational direction.

10. Apparatus as set forth in claim 9, wherein respective directional rotation means comprise respective roller clutch mechanisms.

11. Apparatus as set forth in claim 10, wherein each roller clutch mechanism is oriented to drive its respective drive wheel in a direction opposite from the direction of the other drive wheel.

12. Apparatus as set forth in claim 1, further comprising two idler wheels, and wherein the biasing means comprises a pneumatic cylinder and piston mechanism that biases an idler wheel into contact with the track generally diametrically opposite a respective drive wheel.

13. Apparatus as set forth in claim 1, wherein the drive wheels are mounted for rotation in respective drive wheel brackets, the respective drive wheel brackets being pivotally mounted to the frame at respective pivot points which are different from respective drive wheel rotation axes.

14. Apparatus as set forth in claim 13, wherein respective rotational actuators are mounted to respective wheel brackets.

15. Apparatus as set forth in claim 13, wherein the biasing means comprises a pneumatic cylinder and piston mechanism that biases both drive wheel brackets in respective directions to urge respective drive wheels into contact with the track.

16. Apparatus as set forth in claim 1, wherein respective rotational actuators drive respective drive wheels via respective air clutch mechanisms.

17. Apparatus as set forth in claim 1, wherein the rotational actuators comprises pneumatic actuators that drive respective drive wheels in rotational increments.

18. Apparatus as set forth in claim 17, wherein respective rotational actuators are mounted to position respective drive wheels on the same side of the track.

19. Apparatus as set forth in claim 17, wherein respective rotational actuators are mounted to position respective drive wheels on opposite sides of the track.

20. Apparatus for removing accumulated sediment, sludge, or liquid from the bottom of a liquid vessel, comprising:

a track positioned adjacent the bottom of the liquid vessel;

a tractor adapted to ride along the track within the liquid vessel, the tractor comprising:
a frame;
first and second drive wheels mounted to the frame;
first and second rotational actuators mounted to the frame for driving respective drive wheels;
biasing means mounted to the frame for biasing the drive wheels into engagement with the track; and
guide means mounted to the frame for guiding the tractor along the track; and suction means mounted to the frame for sucking sediment, sludge, and liquid from the bottom of the liquid vessel, whereby the rotational actuators drive respective drive wheels in order to propel the apparatus along the track.

21. Apparatus as set forth in claim 20, wherein the track is circular in cross-section, having an outer cylindrical surface.

22. Apparatus as set forth in claim 20, wherein the respective drive wheels have concave-semi-circular circumferences in order that the wheel circumferences will optimally engage the outer cylindrical surface of the track.

23. Apparatus as set forth in claim 20, wherein the biasing means comprises a pneumatic cylinder and piston mechanism.

24. Apparatus as set forth in claim 20, wherein the rotational actuators are air-driven.

25. Apparatus as set forth in claim 20, wherein respective rotational actuators are hard-mounted directly to the frame.

26. Apparatus as set forth in claim 20, further comprising guide means mounted to the frame for guiding the apparatus along the track.

27. Apparatus as set forth in claim 26, wherein the guide means comprises a guide wheel mounted to the frame for rotation along the track.

28. Apparatus as set forth in claim 20, further comprising directional rotation means for permitting the drive wheels to rotate in one direction only and preventing rotation of the drive wheels in the opposite rotational direction.

29. Apparatus as set forth in claim 28, wherein respective directional rotation means comprise respective roller clutch mechanisms.

30. Apparatus as set forth in claim 29, wherein each roller clutch mechanism is oriented to drive its respective drive wheel in a direction opposite from the direction of the other drive wheel.

31. Apparatus as set forth in claim 20, further comprising two idler wheels, and wherein the biasing means comprises a pneumatic cylinder and piston mechanism that biases an idler wheel into contact with the track generally diametrically opposite a respective drive wheel.

32. Apparatus as set forth in claim 20, wherein the drive wheels are mounted for rotation in respective drive wheel brackets, the respective drive wheel brackets being pivotally mounted to the frame at respective pivot points which are different from respective drive wheel rotation axes.

33. Apparatus as set forth in claim 32, wherein respective rotational actuators are mounted to respective drive wheel brackets.

34. Apparatus as set forth in claim 32, wherein the biasing means comprises a pneumatic cylinder and piston mechanism that biases both drive wheel brackets in respective directions to urge respective drive wheels into contact with the track.

35. Apparatus as set forth in claim 20, wherein respective rotational actuators drive respective drive wheels via respective air clutch mechanisms.

36. Apparatus as set forth in claim 20, wherein the rotational actuators comprises pneumatic actuators that drive respective drive wheels in rotational increments.

37. Apparatus as set forth in claim 36, wherein respective rotational actuators are mounted to position respective drive wheels on the same side of the track.

38. Apparatus as set forth in claim 36, wherein respective rotational actuators are mounted to position respective drive wheels on opposite sides of the track.

39. Apparatus as set forth in claim 36, wherein the suction means comprises a suction manifold having a plurality of suction openings along the bottom thereof, the manifold being positioned parallel to and slightly above the bottom of the liquid vessel.

* * * * *